June 24, 1958 R. C. ZEIDLER ET AL 2,840,208
CLUTCH WITH VIBRATION DAMPENER
Filed Sept. 1, 1951 4 Sheets-Sheet 3

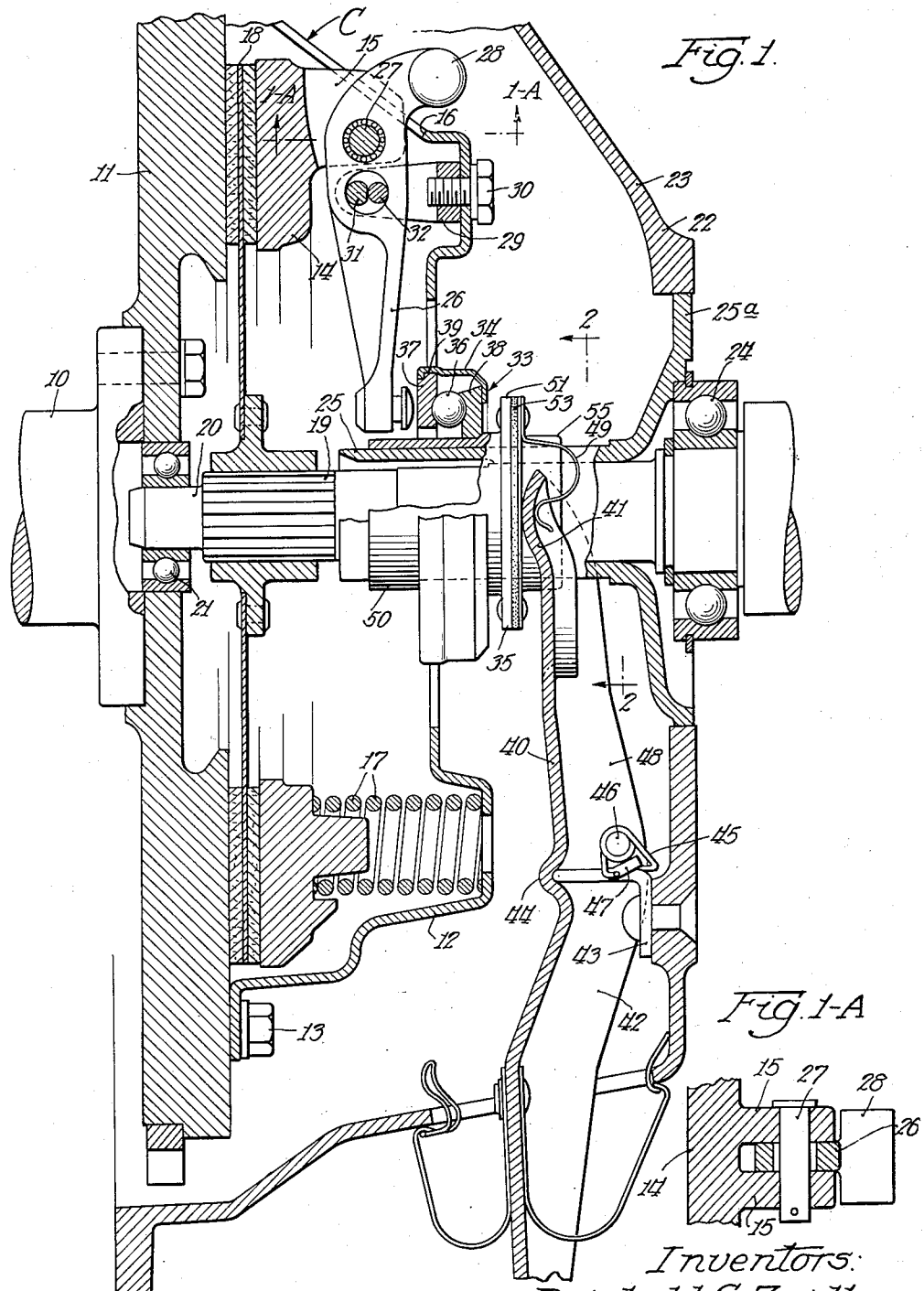

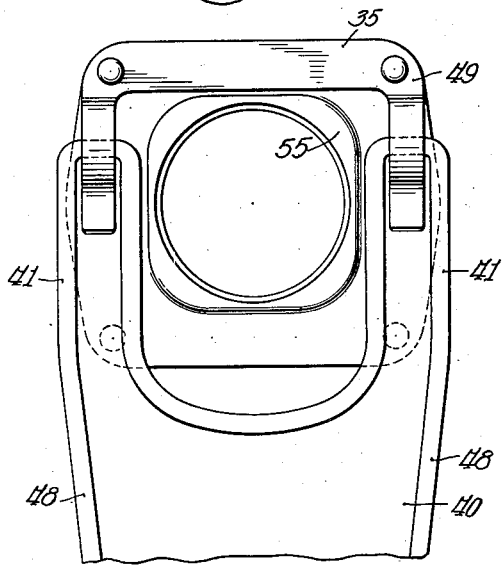
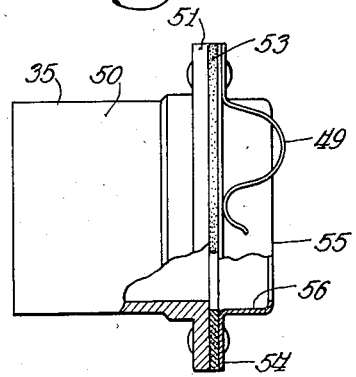
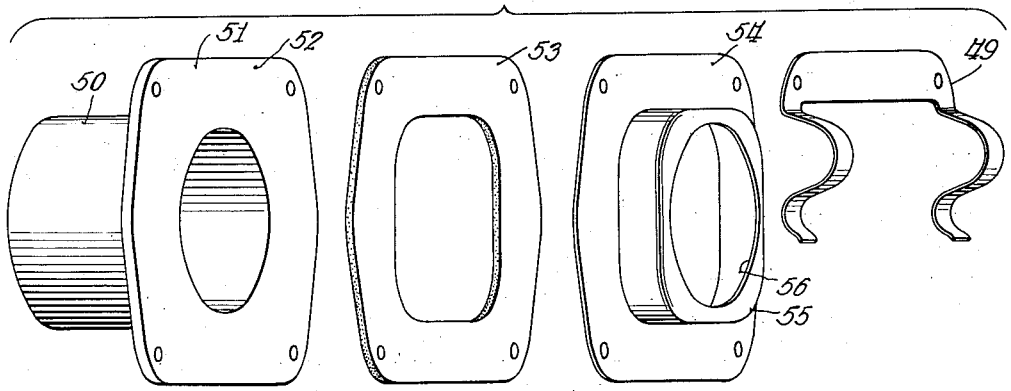
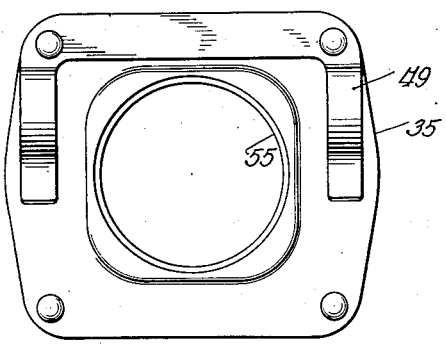

Inventors:
Reinhold C. Zeidler
Daniel W. Lysett.

By H. J. Schmid Atty.

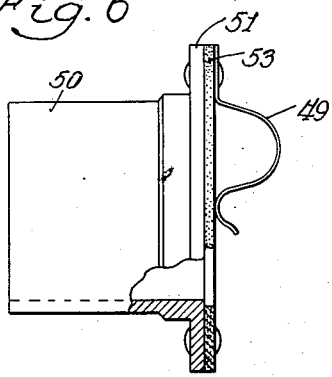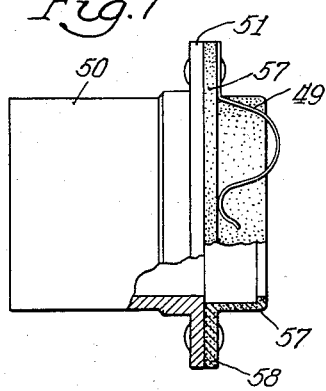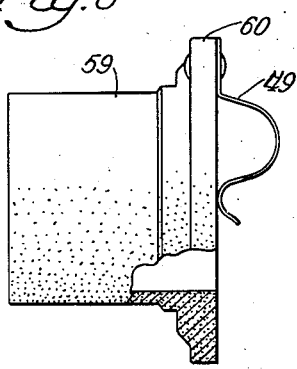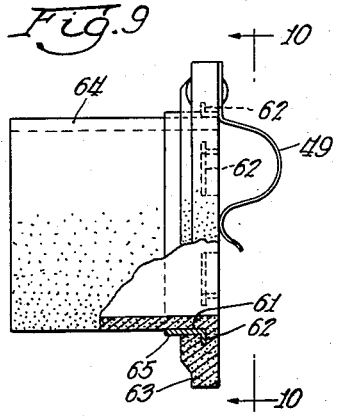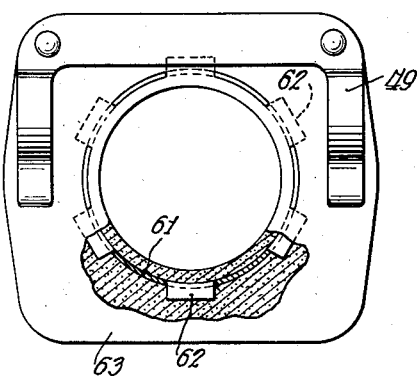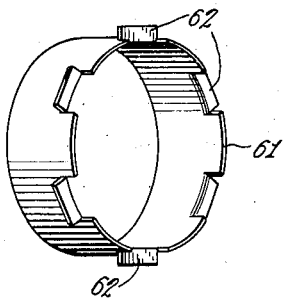

United States Patent Office 2,840,208
Patented June 24, 1958

2,840,208

CLUTCH WITH VIBRATION DAMPENER

Reinhold C. Zeidler, Detroit, and Daniel W. Lysett, Utica, Mich., assignors to Borg-Warner Corporation, Chicago, Ill., a corporation of Illinois Application September 1, 1951, Serial No. 244,778

2 Claims. (Cl. 192—99)

This invention relates to clutches and more particularly to a clutch control mechanism embodying a vibration-dampening and noise-insulating device.

Clutches, used with automotive engines, employ a pressure plate movably mounted on a supporting structure, connected to the engine crankshaft, to engage a driven plate to transmit drive from the engine to a driven shaft, and the plates are released by control structure, usually mechanical linkage, manually operable by the operator to interrupt the transmission of power by the clutch. At certain engine speeds and when the clutch plates are released, torsional disturbances or vibrations and bending of the engine crankshaft causes the pressure plate to vibrate and rattle against its supporting structure causing an objectionable noise transmitted through the mechanical control linkage to the automobile operator.

For example, in many clutches, the pressure plate is provided with drive lugs positioned within apertures in a supporting cover plate, usually a sheet metal stamping, and, in the released condition of the clutch, the pressure plate can be said to be almost a free body being restrained only through the friction created in the mechanical control linkage attached thereto. If there is any play allowing any limited relative movement between the pressure plate and the cover plate, the pressure plate will tend to rattle due to the pressure plate lugs vibrating and hitting against the walls of the cover plate apertures. While such rattle condition could be avoided by closely fitting the lugs in the apertures of the cover plate, it has been found impractical since heat expansion of the pressure plate, during clutch operation, would cause the lugs to bind in the apertures and result in defective clutch operation, such as clutch slippage.

It is an object of the present invention to provide a vibration-dampening and noise-eliminating device for use in the control structure of a clutch to eliminate the transmission of objectionable noise in the clutch to the automobile driver.

Another object of the invention is to provide, in a clutch control mechanism, a control device effective to dampen vibrations, and ensuing noise transmission, from a clutch to portions of the mechanism adjacent the automobile operator.

Another object of the invention is to provide means for eliminating the transmission of vibrations and attendant noise of a clutch, in released condition through linkage controlling the clutch to a manually actuatable member, such as a clutch pedal.

A further object of the invention is to provide an improved clutch release bearing assembly in a clutch control mechanism embodying a clutch pedal under the manual control of an operator, the improvement residing in the assembly having means for dampening vibrations and the transmission of noise from an engine-driven clutch, when released, through the control mechanism to the clutch pedal.

Other objects and advantages of the invention will become apparent from the following description taken in connection with the drawings, in which:

Fig. 1 is a vertical sectional view taken through a clutch and its control mechanism embodying our novel vibration-dampening device or release bearing assembly;

Fig. 1a is a sectional view, said section being taken on line 1a—1a of Fig. 1;

Fig. 2 is an enlarged section taken on line 2—2 of Fig. 1;

Figs. 3, 4 and 5 are views illustrating the device shown in Figs. 1 and 2 in greater detail, Fig. 3 being a side elevation, partly in section, Fig. 4 being an end view, and Fig. 5 an exploded view of the device illustrating the various parts of the device perspectively;

Fig. 6 illustrates a modification of the device shown in Figs. 1 to 5, inclusive;

Fig. 7 illustrates another modification of the device shown in Figs. 1 to 5, inclusive;

Fig. 8 illustrates a further modification of the device shown in Figs. 1 to 5, inclusive;

Figs. 9, 10 and 11 illustrate still another modification of the device shown in Figs. 1 to 5, inclusive; Fig. 9 being a side elevation, partly in section to more clearly illustrate the device, Fig. 10 is an end view of the device shown in Fig. 9, and Fig. 11 illustrates an insert employed in the device shown in Figs. 9 and 10;

Figure 13:
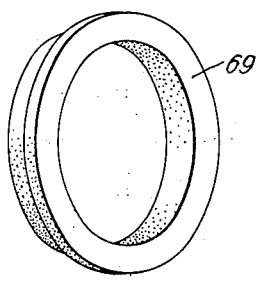
Figure 12:
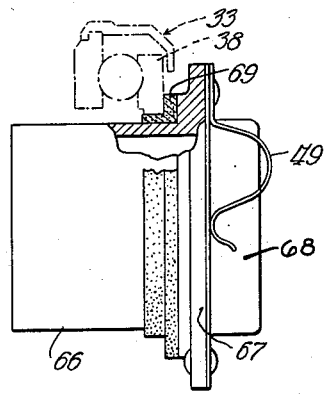
Figure 15:
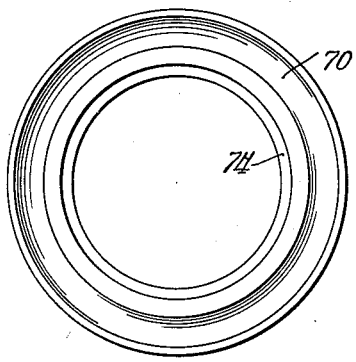
Figure 14:
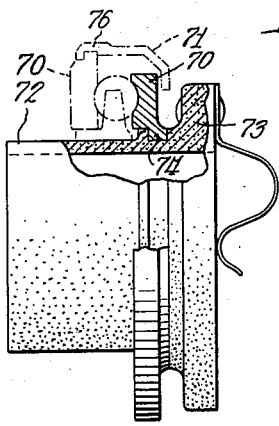

Figs. 12 and 13 illustrate still another modification of the device shown in Figs. 1 to 5, inclusive, Fig. 12 being a side elevation, partly in section, and Fig. 13 illustrating a non-metallic ring employed in the device shown in Fig. 12; and Figs. 14 and 15 illustrate a still further modification of the device shown in Figs. 1 to 5, inclusive, Fig. 14 being a side elevation, partly in section, and Fig. 15 being a side view of a bearing race shown in Fig. 14.

Referring to the drawings, and more particularly Figs. 1 and 2 thereof, the clutch, or power-transmitting device, generally indicated at C, is of the type illustrated and described in Wemp Patent 2,038,017 and the clutch may be associated with the usual flywheel of an internal combustion engine of an automobile, the crankshaft of such engine being illustrated at 10 and the flywheel at 11. A cover plate 12 is secured to the flywheel by bolts 13 and clutch pressure plate 14 is mounted for rotation on the cover plate 12 by a plurality of lugs or bosses 15 extending through a plurality of circumferentially disposed apertures 16 in the cover plate 12. The pressure plate lugs 15 are guidingly and slidingly supported in the apertures in the cover plate to provide a driving connection between the cover plate and the pressure plate to rotate the pressure plate in unison with the flywheel 11. A plurality of coil springs 17 are disposed between the pressure plate 14 and the cover plate 12 for packing the pressure plate against a driven disc 18 so that the driven disc will be tightly engaged between the pressure plate and the flywheel.

The driven disc, or plate 18, is secured or splined to a driven shaft 19 having a reduced portion 20 piloted in the flywheel 11, being rotatably mounted therein by means of ball-bearing assemblies 21. The driven shaft 19 extends through a rear wall 22 of the clutch housing 23 and is rotatably supported within said wall 22 by a bearing assembly 24 positioned within the flanged portion 25a of a sleeve 25 mounted in an opening in the wall 22. The driven shaft 19 extends through and engages the sleeve 25.

As shown in Fig. 2, the bosses 15 on the pressure plate may be bifurcated and a clutch-releasing lever 26 may be mounted between the portions of each boss. Each lever is connected to the pressure plate lugs or bosses as shown in Fig. 1 wherein a pin 27 serves to mount the lever pivotally, the pivotal mounting preferably including an anti-friction bearing structure having needle type rollers. Each of the levers 26 is provided with a weight 28 at its radially outer end extending through the apertures 16 in the cover plate 12. Each lever 26 is fulcrumed on the cover plate by bifurcated brackets 29 secured to the cover plate by means of bolts 30. The pivotal connection for fulcruming the levers 26 on the brackets 29 includes a pin 31 and a roller 32 functioning as described in the aforesaid Wemp patent. The centrifugal levers 26 are arranged as described so that the outward centrifugal force of the levers, as a whole, is taken by the pressure plate through the pivot pins 27 and the arrangement is such that the centrifugal force is translated into pressure for increasing the pressure with which the clutch is engaged over that provided by the springs 17. The clutch packing springs have the strength to pack the driven plate 18 between the pressure plate and the flywheel with just sufficient torque capacity to take care of maximum engine torque. The centrifugally weighted levers increase the clutch packing pressure upon rotation of the clutch to increase the torque capacity of the clutch as the kinetic energy of the engine and the rotary driving members of the clutch builds up incident to rotation. The description and function of the clutch levers 26 and more particularly pointed out in Wemp Patent 2,021,973.

The clutch control arrangement or mechanism for effecting disengagement or release of the pressure plate 14 from the driven disc 18 is a force-transmitting train in the form of manually operable mechanical linkage and comprises the levers 26 having their radially inner ends engageable with a throw-out or release thrust bearing assembly indicated at 33, and including a bearing 34 and a carrier 35, the bearing being fixed to the carrier by any suitable means, such as a press fit. The bearing 34 comprises a plurality of balls 36 positioned between axially spaced races 37 and 38 held in position by an inwardly flanged collar 39. The carrier 35 is slidably mounted upon the sleeve 25 of the clutch housing 23.

The release bearing assembly is movable in the direction of the flywheel 11 by a release fork or lever 40 and rotates the levers 26 in a clockwise direction about the fulcrum point afforded by the pin 31 and roller 32. It will be apparent that the levers 26, through their pivotal connection 27 with the pressure plate, will cause the pressure plate to be moved rearwardly to disengage the driven clutch plate 18. The fork 40 comprises an elongated sheet metal stamping having a generally U-shaped cross-section with a bifurcated upper region providing fingers 41 straddling the driven shaft and engaging the carrier 35; the lever also has arm portion 42 which is coupled by mechanical linkage (not shown) to a manually operated clutch release pedal (not shown). The fork is mounted on a stamped bracket 43 secured by rivets to the clutch housing 23. The bracket is of L-shaped section having a horizontally disposed portion extending in a forward direction to provide a fulcrum at its outer edge for seating the concavo-convex deformation 44 extending transversely across the adjacent region of the fork. Hairpin type springs 45 are provided to maintain the fork in position against the bracket 43, the springs 42 being coiled about a pin 46 secured to the fork with one of the opposite ends of the springs engaging a struck-out portion 47 on the bracket 43 and the other end of the spring being disposed within an opening in one of the adjacent flanges 48 of the fork.

To maintain the bifurcated end of the fork in engagement with the carrier 35, a U-shaped spring 49 is secured by rivets to the carrier, the spring having each of the legs thereof of S-shape as shown in Figs. 1 and 3 to provide spring tension on the fork when the ends of the spring are positioned within the channels of the fingers 41 of the fork.

During operation of the clutch described, an annoying and disturbing noise is produced by the clutch which is caused by the rattling of the pressure plate 14 against the side walls of the apertures of the cover plate 12 when the clutch is released and the engine either accelerated or held at a constant speed under certain engine conditions. This pressure plate rattle, and the ensuing noise, is caused by torsional vibrations of the engine crankshaft being transmitted and manifesting itself in the clutch. In view of the fact that a certain amount of clearance is necessary between the pressure plate drive lugs and the side walls of the apertures in the cover plate, the pressure plate has limited movement relative to the cover plate and is restrained only slightly through the friction created in the lever system. Accordingly, as vibrations of the crankshaft will be transmitted to the pressure plate, the drive lugs of the pressure plate tend to rattle against the side walls of the cover plate apertures. Heretofore, this objectionable rattling noise has been transmitted through the mechanical linkage to the clutch pedal where such noise has been annoying to the automobile operator.

The present invention is directed to providing a clutch control member, in the clutch control linkage, provided with a vibration-dampening and noise-insulating material to prevent the transmission of vibrations and noise of the clutch through portions of the mechanical control linkage, including the clutch pedal, adjacent the automobile driver. The clutch control member embodying the vibration-dampening and noise-insulating material is the release bearing assembly 33 and, more particularly, the carrier 35 thereof shown in Fig. 1, and in greater detail in Figs. 2 to 5, inclusive.

More particularly, the release bearing carrier 35 comprises a cylindrical metal tube or shell 50 formed of a metal, such as steel, having one end thereof flared to provide a radially extending flange 51 presenting a flat face 52 engaging one side of a ring 53 formed of a vibration-dampening and noise-insulating material, the opposite side of the ring being engaged with a flange 54 of a metal grease retainer 55, preferably of steel. The grease retainer has a cylindrical body portion 56 provided at one end with the flange 54 engageable by the fingers 41 of the fork 40, the opposite end of the body 56 having inturned edges for receiving a packing ring (not shown) for affording lubrication to the engaging surfaces of the carrier 35 and driven shaft 19. The described parts of the carrier are retained in assembly by rivets extending through aligned openings in the spring clip 49, the grease retainer 55, the ring 53, and the flange 51 of the carrier 35. It will be apparent from an inspection of Figs. 3 and 5 that while the rivets act to securely fasten the described parts of the carrier together, the amount that the rivets tighten these parts does not affect the described characteristics of the material forming the ring as the rivets will compress the material only at the corners without compressing the body of the ring 53 to an extent impairing its vibration-dampening and noise-insulating characteristics. It will therefore be apparent that any vibrations and noise from pressure plate rattle, and transmitted through the metallic clutch release levers 26 and thrust bearing 34 to the tubular portion 50 and flange 51 of the carrier 35, will be absorbed by the ring 53 so that the noise and vibrations will not be transmitted through the grease retainer, and the lever 40 to the linkage connecting the lever 40 to the accelerator pedal, when the operator is actuating the clutch pedal, and thereby the clutch control linkage, to release the clutch during engine operation.

Figs. 6 to 14 illustrate various modifications of the release bearing carrier shown in Figs. 1 to 5, inclusive, each of these modifications embodying insulating material to prevent the transmission of vibrations and noise from the engaging rattling parts of the clutch pressure plate 14 and cover plate 12 through the fork 40 and other linkage connected to the clutch pedal.

More particularly, Fig. 6 illustrates the same body portion 50 and flange 51 of the carrier shown in Figs. 1 to 5, and, in this modification, the spring clip 49 is directly connected to the ring 53 of insulating material whereby the fingers 41 of the fork 40 directly engage the ring 53, which takes the thrust of the release fork.

Fig. 7 illustrates a carrier 50 shown in Figs. 1 to 5, and to which is secured a grease retainer 57 formed of vibration-dampening and noise-insulating material. It will be noted that the grease retainer 57 is molded to a shape similar to the steel grease retainer 55 of Figs. 1 to 5, inclusive, and that the spring clip is secured to the grease retainer. The fingers 41 of the lever engage the flange 58 of the grease retainer 57.

Fig. 8 illustrates a release bearing carrier formed of vibration-dampening and noise-insulating material and comprising a cylindrical body portion 59 having a radially extending flange 60 at one end thereof, the spring clip 49 being secured to the flange 60 and the fingers of the shift fork 40 directly engaging the flange 60.

Figs. 9, 10 and 11 illustrate another modification of the invention in which a release bearing carrier is molded of a vibration-dampening and noise-insulating material including a cylindrical steel insert 61 having a plurality of tangs 62 extending radially outwardly thereof into the material forming the flange 63 of the tubular body portion 64 molded about the insert. The insert is preferably formed of steel, and as shown in Fig. 9, has one end portion 65 extending from the flange 63 of the carrier and circumscribing the tubular body portion 64. The portion 65 of the steel insert can be machined to provide a diameter suitable for the purpose of providing a pilot with a press fit for the release bearing 34 shown in Fig. 1.

Figs. 12 and 13 illustrate another modification of the invention wherein the carrier, including the tubular body portion 66, the flange 67, and grease retainer 68, is entirely made of metallic parts with a ring 69 of vibration-dampening and noise-insulating material of L-section directly disposed between and engaging the metallic carrier and the metallic release bearing 33. The ring 69 thus acts as the sole support of the release bearing 33 on the carrier as the radially extending portion of the ring disposed between spaced opposed radially extending surfaces of the race 38 of the bearing 33 and the flange 67 of the carrier, and the axially extending portion of the ring 69 is disposed between two adjacent opposed telescoping and axially spaced surfaces of the race 38 of the bearing 33 and the body portion 66 of the carrier. The ring 69 may be formed of a molded material pressed into place on the carrier and thereafter having its diameter machined to properly pilot and tightly fit the race 38 of the bearing 33.

Figs. 14 and 15 illustrate another modification of the invention in which one of the two steel races 70 of the bearing 71 is molded integral with the body portion 72 and flange 73 of a carrier formed of vibration-dampening and noise-insulating material. It is contemplated that the race 70 be provided with a radially inner offset edge portion 74 placed in a mold having suitable provision for forming the body portion of the carrier with an annular groove 75 for receiving the radially inner edge portion 74 of the race 70. The bearing 71 may be balanced after assembly by spinning over the rear part of the bearing shell 76.

Examples of vibration-dampening and noise-insulating materials, preferably and satisfactorily employed in forming or molding the rings 53 (Figs. 1 to 5, and 6), the grease retainer 57 (Fig. 7), the body portion and flange of the carriers (Figs. 8, 9–10, 14), and ring 69 (Fig. 14), may be either of the following non-metallic compositions:

(1) Laminated plastic consisting of cotton fabric treated with a phenolic resin and bonded under considerable heat and pressure.

(2) Cork granules bonded together with a synthetic rubber, which may be a polymer of monochlorbutadiene (commonly known by its trade name, neoprene) or a co-polymer of butadiene and acrylonitrile (commonly known by its trade name, Buna-H).

(3) Cork granules bonded together with a phenolic resin.

(4) Synthetic rubber, such as identified above, and preferably of 40 durometer hardness.

In view of the foregoing, it will be apparent that we have provided a new and improved control member embodying insulating material to effectively dampen vibrations and eliminate noise in a clutch control mechanism caused by the clutch in its released condition and under certain engine operating conditions. While we have specifically described various embodiments of release bearing assemblies for performing this function, it will be understood that other forms of release bearing assemblies may be provided without departing from the spirit and scope of the invention as defined by the appended claims.

We claim:

1. In a clutch having a rotatable support fixed against axial movement, a driving plate carried by said support and selectively movable axially, a driven plate engageable by said driving plate, means including a plurality of radially extending levers and an axially movable thrust bearing assembly for disengaging said driving plate from said driven plate, said thrust bearing assembly including a tubular metallic carrier having at one end an outwardly extending radial flange, lever means for actuating said thrust bearing assembly, vibration-dampening material interposed between the flange of said tubular carrier and said lever means to prevent vibrations therebetween and spring means for urging said lever means into engagement with said vibration-dampening material.

2. In a clutch having a rotatable support fixed against axial movement, a driving plate carried by said support and selectively movable axially, a driven plate engageable by said driving plate, means including a plurality of radially extending levers and an axially movable thrust bearing assembly for disengaging said driving plate from said driven plate, said thrust bearing assembly including a tubular carrier, lever means for actuating said thrust bearing assembly, vibration-dampening material interposed between said tubular carrier and said lever means to prevent vibrations therebetween, and spring means for urging said lever means into engagement with said vibration-dampening material.

References Cited in the file of this patent

UNITED STATES PATENTS

| Number | Name | Date |
|---|---|---|
| 1,336,000 | Sturt | Apr. 6, 1920 |
| 1,457,221 | Fishburn | May 29, 1923 |
| 1,695,750 | Whiteley | Dec. 18, 1928 |
| 1,912,649 | Meyer | June 6, 1933 |
| 2,021,973 | Wemp | Nov. 26, 1935 |
| 2,038,017 | Wemp | Apr. 21, 1936 |
| 2,046,916 | Kieffer | July 7, 1936 |
| 2,170,172 | Wemp | Aug. 22, 1939 |
| 2,234,843 | Katcher | Mar. 11, 1941 |
| 2,250,394 | Reed | July 22, 1941 |
| 2,341,497 | Amtsberg | Feb. 8, 1944 |
| 2,555,860 | Reed | June 5, 1951 |
| 2,644,413 | Sauer | July 7, 1953 |

FOREIGN PATENTS

| Number | Country | Date |
|---|---|---|
| 583,300 | France | Oct. 29, 1924 |
| 437,052 | Great Britain | Oct. 23, 1935 |
| 531,046 | Great Britain | Dec. 27, 1940 |
| 587,299 | Great Britain | Apr. 21, 1947 |